UNITED STATES PATENT OFFICE.

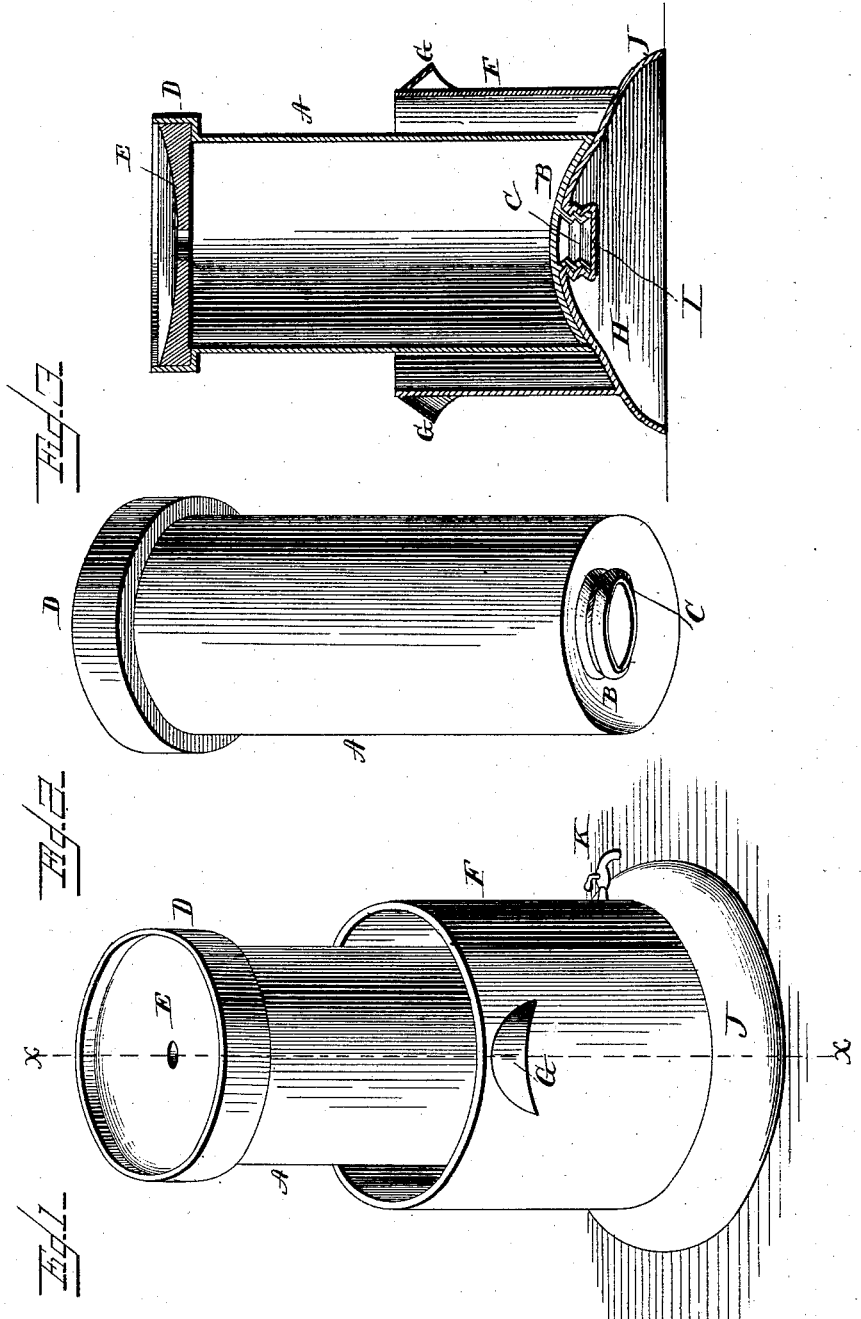

JOHN W. BOYD, OF VEVAY, INDIANA, ASSIGNOR OF ONE-HALF TO MARION C. WALDEN, OF SAME PLACE.

CHURN.

SPECIFICATION forming part of Letters Patent No. 364,476, dated June 7, 1887.

Application filed March 28, 1887. Serial No. 232,741. (No model.)

*To all whom it may concern:*

Be it known that I, JOHN W. BOYD, a citizen of the United States, and a resident of Vevay, in the county of Switzerland and State of Indiana, have invented certain new and useful Improvements in Churns; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved churn adapted to regulate the temperature of the cream while being churned. Fig. 2 is a bottom perspective of the churn removed from the outer casing, and Fig. 3 is a vertical sectional view taken on line $x$ $x$ in Fig. 1.

My invention relates to churns for retaining an even temperature in milk while being churned; and it consists in the improved construction and combination of parts of the same, as will be hereinafter more fully described and claimed.

In the accompanying drawings, the letter A denotes the churn, of any suitable construction, having a concave bottom, B. The said bottom has secured to it a screw-threaded tenon, C, projecting downwardly, and the upper portion of the said churn is provided with an upwardly-extending enlarged flange, D, adapted to receive the concave perforated cover E.

The letter F denotes a shell or casing, having bails or ears G, by which it may be lifted and transferred, when desired; and H indicates the convex bottom, having centrally located therein the downwardly-extending interiorly screw-threaded gudgeon or recess I, which is preferably soldered to the bottom, but which may be secured in any other suitable manner without departing from the spirit of my invention. A rim, J, is secured to the lower end of the said shell or casing, and serves as a support for the same.

It will be seen that by forming the bottom of the shell or casing with the downwardly-projecting rim J, and also by having the said bottom convexed, the downwardly-projecting screw-threaded gudgeon will not come in contact with the floor, thus allowing the shell or casing to rest firmly while in use.

The churn A is now placed in the shell or casing, and firmly secured therein by means of the downwardly-extending screw-threaded tenon being screwed into the screw-threaded gudgeon or recess in the bottom of the shell or casing, while the concave bottom of the said churn and the convex bottom of the shell or casing are brought in contact with each other, thus protecting the screw-threaded tenon and the screw-threaded gudgeon or recess from any lateral strain exerted upon the churn while churning.

When the weather is very cold, the cream is apt to cling to the sides of the churn and upon the dasher, thus causing considerable trouble for the operator to churn, while if the cream is too warm the butter produced from the same will be of an inferior quality. To remedy these difficulties, I construct a churn of the above-described class, and employ water as my medium for regulating the temperature of the cream. Should the cream when placed in the churn be too cold, the shell or casing is filled with warm water, which will raise the temperature of the cream in the churn to the desired point, while if the cream is too warm when placed in the churn cold water may be used in place of the warm water. When it is desired to remove the water from the said shell or casing, the spigot K, situated in the lower portion of the said shell or casing, is turned, thus allowing the water to escape.

From the foregoing description, taken in connection with the accompanying drawings, the operation and advantages of my invention will be readily understood without requiring further explanation. It will be seen that my invention is simple and inexpensive in construction and not liable to get out of order.

When desired, the churn may be readily removed from the shell and used in the old way for churning butter, for by constructing it with the concave bottom the downwardly-projecting tenon will be prevented from being brought in contact with the floor, which, if not concave, would prevent the churn having a level bearing upon the floor.

Having thus described my invention, I claim and desire to secure by Letters Patent of the United States—

The combination, with the churn having a concave bottom provided with a downwardly-extending exteriorly screw-threaded tenon and having at its upper end an enlarged upwardly-extending flange and a top or cover, of an outer shell or casing having a convex bottom provided with a downwardly-extending interiorly screw-threaded gudgeon or socket and an annular downwardly-projecting rim integral with the lower edge of the said shell or casing, a spigot, and ears or bails secured to the upper side of the said shell or casing, substantially as and for the purpose shown and described.

In testimony that I claim the foregoing as my own I have hereunto affixed my signature in presence of two witnesses.

JOHN W. BOYD.

Witnesses:
GEORGE S. PLEASANTS,
JOHN F. PATTON.